(12) United States Patent
Huang et al.

(10) Patent No.: US 8,102,930 B2
(45) Date of Patent: Jan. 24, 2012

(54) DEMODULATION OF 16-QAM, DCM DATA SYMBOLS USING TWO HYBRID-QPSK CONSTELLATIONS

(75) Inventors: Xiaojing Huang, North Ryde (AU); Yunxin Li, Ryde (AU); Darryn Lowe, Helensburgh (AU)

(73) Assignee: Agere Systems Inc., Allentown, PA (US)

( * ) Notice: Subject to any disclaimer, the term of this patent is extended or adjusted under 35 U.S.C. 154(b) by 1316 days.

(21) Appl. No.: 11/729,345

(22) Filed: Mar. 28, 2007

(65) Prior Publication Data

US 2008/0240299 A1    Oct. 2, 2008

(51) Int. Cl.
*H04L 5/12*    (2006.01)

(52) U.S. Cl. ......................... 375/261; 375/340

(58) Field of Classification Search .................. 375/260, 375/261, 340, 342
See application file for complete search history.

(56) References Cited

U.S. PATENT DOCUMENTS

| | | | | |
|---|---|---|---|---|
| 6,434,188 B1* | 8/2002 | Hwang et al. | .................. | 375/222 |
| 2005/0193307 A1* | 9/2005 | Wengerter et al. | ............ | 714/749 |
| 2007/0019753 A1* | 1/2007 | Kim | ................ | 375/260 |
| 2007/0091984 A1* | 4/2007 | Batra et al. | .................... | 375/130 |
| 2007/0230594 A1* | 10/2007 | Mo et al. | ....................... | 375/260 |
| 2007/0297538 A1* | 12/2007 | Kim | .............................. | 375/340 |
| 2008/0056392 A1* | 3/2008 | Park et al. | ...................... | 375/260 |
| 2008/0212694 A1* | 9/2008 | Leach et al. | .................. | 375/260 |
| 2008/0291888 A1* | 11/2008 | Maret et al. | ................... | 370/342 |

OTHER PUBLICATIONS

Vineet Srivastava; , "Practical Algorithms for Soft-Demapping of Dual-Carrier Modulated Symbols," Communication systems, 2006. ICCS 2006. 10th IEEE Singapore International Conference on , vol., no., pp. 1-5, Oct. 2006.*

* cited by examiner

*Primary Examiner* — Jaison Joseph (74) *Attorney, Agent, or Firm* — Mendelsohn, Drucker & Associates, P.C.; Craig M. Brown; Steve Mendelsohn (57) ABSTRACT

In one embodiment, a demapper uses two hybrid-QPSK constellations to demap pairs of equalized data symbols recovered from 16-QAM, DCM OFDM symbols, wherein the equalized data symbols in a pair correspond to the same four-bit group. A first hybrid-QPSK constellation is generated by combining the real components of both 16-QAM mapping constellations onto one coordinate plane. The demapper generates a first set of two decision variables by combining the real components of each equalized data symbol in a pair to correspond to the first hybrid-QPSK coordinate plane. A log-likelihood ratio is then calculated for both decision variables in the set to determine likelihood estimates for the first and second bits of the four-bit group. This process is repeated for the imaginary components of each corresponding pair of equalized data symbols to generate likelihood estimates for the third and fourth bits of the four-bit group.

25 Claims, 7 Drawing Sheets

```
1    % IQ_inA and IQ_inB are two equalized values corresponding to a four-bit group mapped into the DCM
2    % constellations of FIGs. 5(a) and 5(b), respectively. In this implementation, DCM is performed such
3    % that the corresponding values are separated by N/2 tones.
4    IQ_inA = D[k];
5    IQ_inB = D[k+N/2];
6    % Measure the power of the two data symbols by calculating refA and refB. RefA is equivalent to $|\overline{H}[k]|^2$
7    % and refB is equivalent to $|\overline{H}[k']|^2$.
8    refA = $\overline{H}[k]$ *conj($\overline{H}[k]$);
9    refB = $\overline{H}[k+N/2]$*conj($\overline{H}[k+N/2]$);
10   % Line 13 implements Equation (8) and line 14 implements Equation (9).
11   yA = refB*real(IQ_inA);
12   yB = refA*real(IQ_inB);
13   bits_out(1) = (yA + yB/2) /(refA + 4*refB);
14   bits_out(2) = (yA/2-yB) / (4*refA + refB);
15   % Line 18 implements Equation (12) and line 19 implements Equation (13).
16   yA = refB*imag(IQ_inA);
17   yB = refA*imag(IQ_inB);
18   bits_out(3) = (yA + yB/2) / (refA + 4*refB);
19   bits_out(4) = (yA/2-yB) / (4*refA + refB);
```

FIG. 10

DEMODULATION OF 16-QAM, DCM DATA SYMBOLS USING TWO HYBRID-QPSK CONSTELLATIONS

BACKGROUND OF THE INVENTION

1. Field of the Invention

The present invention relates to signal processing, and more specifically, to demapping of received data symbols.

2. Description of the Related Art

Overview of Prior-Art OFDM Transmitter and Receiver

Figure 1:
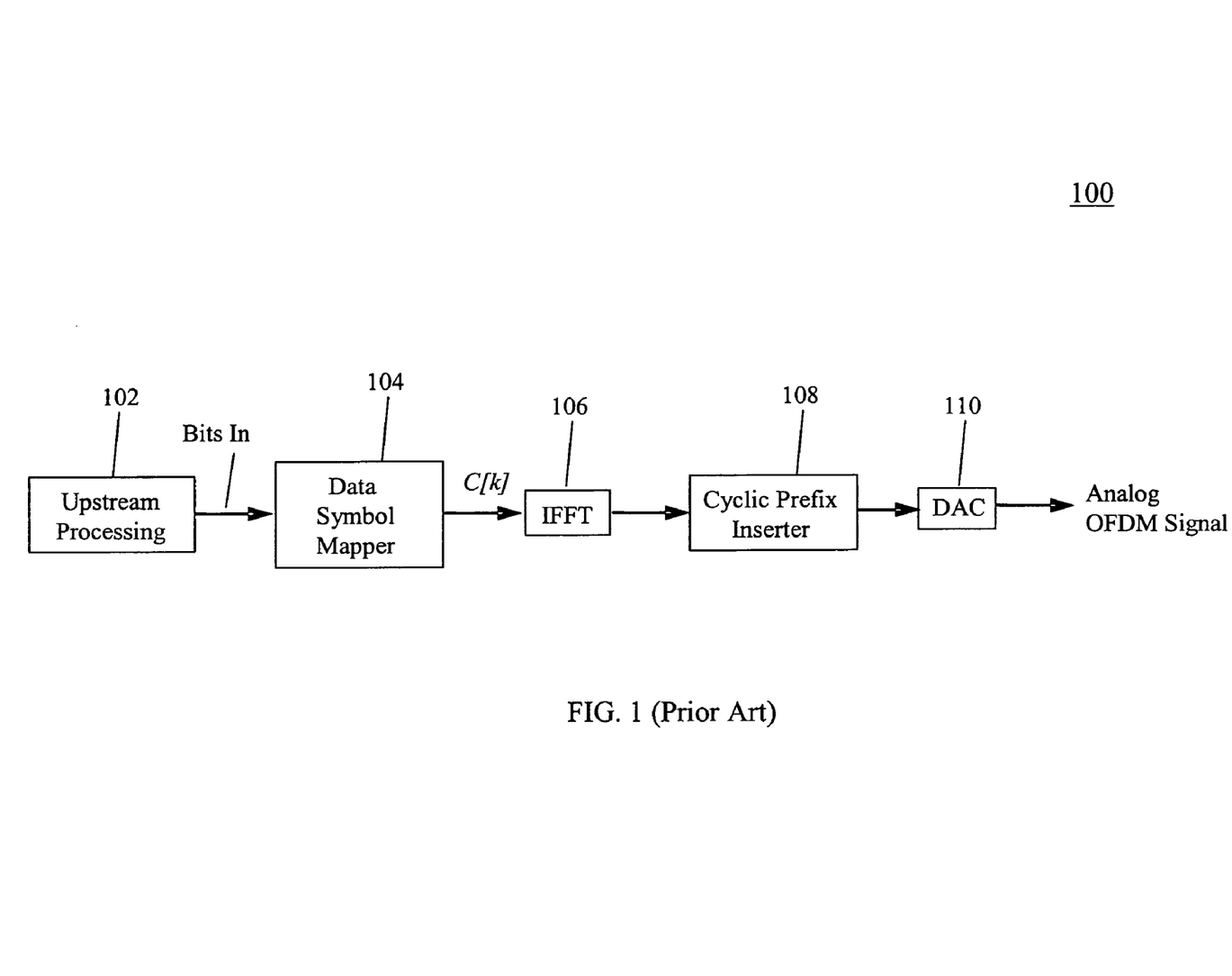
FIG. 1 shows a simplified block diagram of one possible implementation of a prior-art OFDM transmitter.

FIG. 1 shows a simplified block diagram of one possible implementation of a prior-art OFDM transmitter 100. Transmitter 100 converts digital data into analog OFDM signals for transmission. Conversion occurs through steps of processing beginning with upstream processing 102. Upstream processing 102 performs operations to generate a serial bitstream of digital data and might include processing such as convolution coding, analog-to-digital conversion, or other processing.

Data symbol mapper 104 divides the serial bitstream into groups of bits, where each group is mapped into a separate data symbol C[k] using any one of a number of mapping techniques commonly known in the art, including but not limited to quadrature phase-shift keying (QPSK) and 16-quadrature amplitude modulation (16-QAM).

Inverse fast Fourier transform (IFFT) processor 106 performs OFDM modulation to convert the data symbols into OFDM symbols. IFFT processor 106 assigns each set of data symbols to modulate a set of N subcarrier waves (i.e., OFDM tones), where the number of data symbols in a set is less than or equal to the number N of subcarriers. Assignment is performed such that each data symbol C[k] in a set modulates a different subcarrier k in the set of subcarriers. Furthermore, assignment may be performed using any of a number of methods commonly known in the art, including but not limited to methods such as single-carrier modulation (SCM) and dual-carrier modulation (DCM). Each set of symbol-modulated subcarriers is then IFFT transformed into a time-domain, digital OFDM symbol.

Each time-domain OFDM symbol is then prepared for transmission. First, OFDM transmitter 100 may have cyclic prefix inserter 108, which inserts a cyclic prefix onto each OFDM symbol. Then, the OFDM symbol may be converted to analog format by digital-to-analog converter (DAC) 110. OFDM transmitter 100 might also employ other processing commonly known in the art such as radio-frequency (RF) modulation to prepare the OFDM symbol for transmission. The OFDM symbols are then transmitted over any one of a number of transmission media, including but not limited to airwaves, fiber optics, and coaxial cables.

Figure 2:
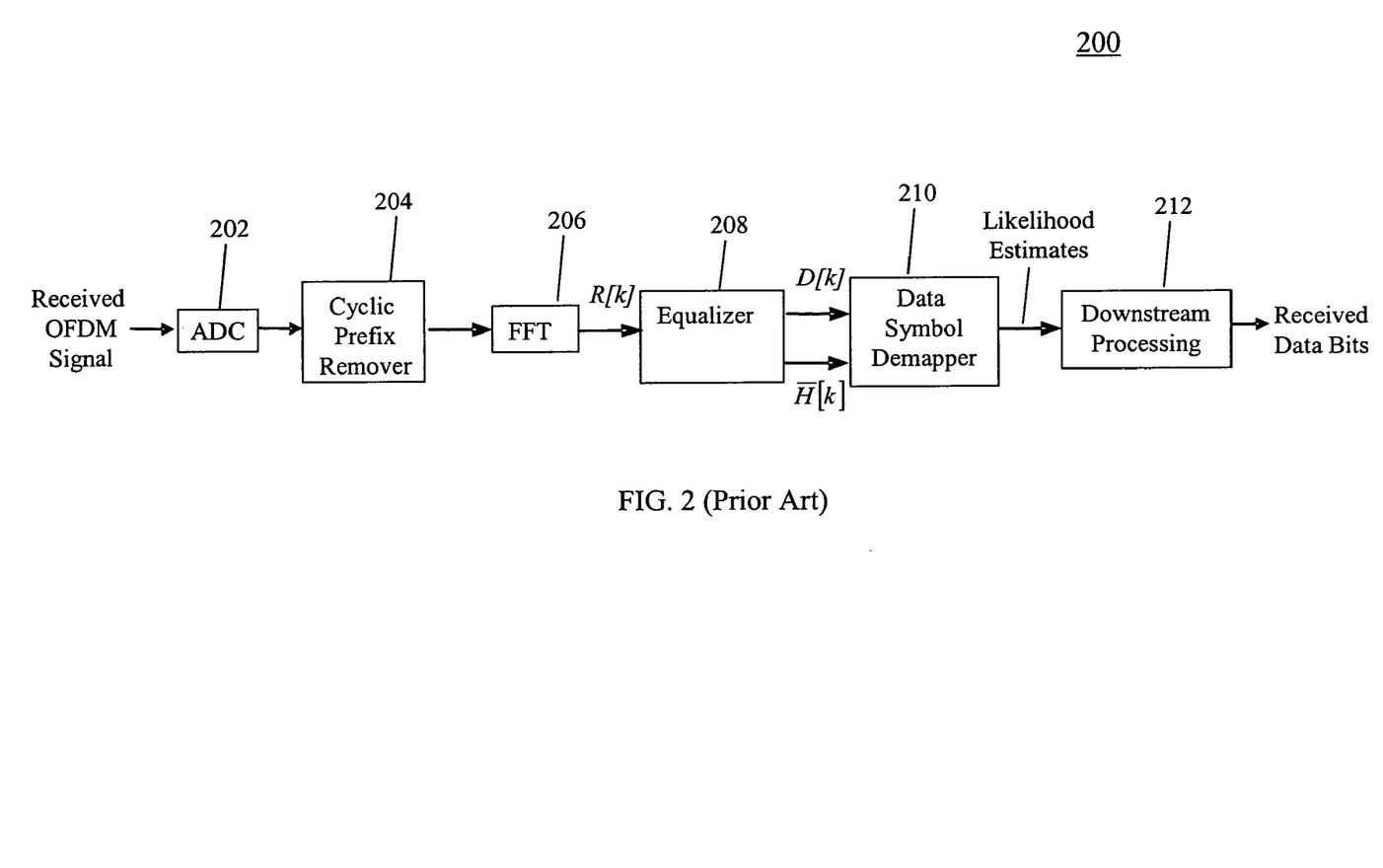
FIG. 2 shows a simplified block diagram of one possible implementation of a prior-art OFDM receiver.

FIG. 2 shows a simplified block diagram of one possible implementation of a prior-art OFDM receiver 200 which receives the time-domain OFDM symbols generated by transmitter 100 of FIG. 1. Receiver 200 has analog-to-digital converter (ADC) 202 which converts received, time-domain OFDM symbols from analog to digital format. Cyclic prefix remover 204 removes the cyclic prefix from each time-domain OFDM symbol if the transmitter employed cyclic prefix insertion. Fast Fourier transform (FFT) processor 206 converts each time-domain OFDM symbol into a set of frequency-domain received data symbols. Each received data symbol R[k] in a set may be represented as a function of the originally transmitted data symbol C[k], the frequency response H[k] of the tone k, and the noise V[k] with variance $\sigma^2$ added to the transmitted signal as shown in Equation (1) below:

$$R[k] = H[k]C[k] + V[k]. \quad (1)$$

Equalizer 208 equalizes each received data symbol R[k] to generate an equalized symbol. Equalization may be performed using any one of a number of approaches commonly known in the art. For example, one such approach is a zero-forcing approach in which each received data symbol R[k] in a set is equalized by dividing the received data symbol R[k] by an estimate $\bar{H}[k]$ of the frequency response. Assuming a perfect estimation of H[k], the zero-forcing equalized data symbol Y[k] may be represented by Equation (2) as follows:

$$Y[k] = \frac{R[k]}{\bar{H}[k]} = C[k] + \frac{V[k]}{\bar{H}[k]} = C[k] + U[k], \quad (2)$$

where the noise U[k] has a variance $$\sigma_U^2 = \frac{1}{|\bar{H}[k]|^2}\sigma^2.$$

To eliminate the division operation of Equation (2), and thus, reduce the complexity of the equalization process, equalized data symbol D[k] can be computed as shown in Equation (3):

$$D[k] = \bar{H}^*[k]R[k] = |\bar{H}[k]|^2 Y[k] = |\bar{H}[k]|^2 C[k] + \bar{H}^*[k]V[k], \quad (3)$$

where the noise $\bar{H}^*[k]V[k]$ has variance $|\bar{H}[k]|^2\sigma^2$

Each equalized data symbol D[k] is then demapped by data symbol demapper 210 using a constellation that corresponds to the mapping used by transmitter 100 of FIG. 1. In so doing, data symbol demapper 210 determines which original data symbol C[k] in the constellation is the likely value (e.g., the likelihood estimate) for the equalized data symbol D[k]. The likelihood estimates may be calculated using any of a number of methods commonly known in the art. For example, demapper 210 may determine the likelihood estimates by calculating log-likelihood ratio (LLR) values through zero-forcing or maximum-likelihood (ML) techniques for the equalized data symbols D[k].

The likelihood estimates are then processed by downstream processing 212. Downstream processing 212 performs operations to recover the originally transmitted bitstream from the likelihood estimates and may include processing such as Viterbi decoding or other processing commonly known in the art to recover the originally transmitted data bitstream.

OFDM Modulation Employing QPSK and SCM

As discussed above, transmitter 100 converts the serial bitstream into digital, time-domain OFDM symbols using OFDM modulation. OFDM modulation may be implemented using different combinations of mapping and subcarrier modulation. For example, in a first such OFDM modulation implementation, data symbol mapper 104 of FIG. 1 employs QPSK mapping, and IFFT processor 106 employs single-carrier modulation.

Figure 3:
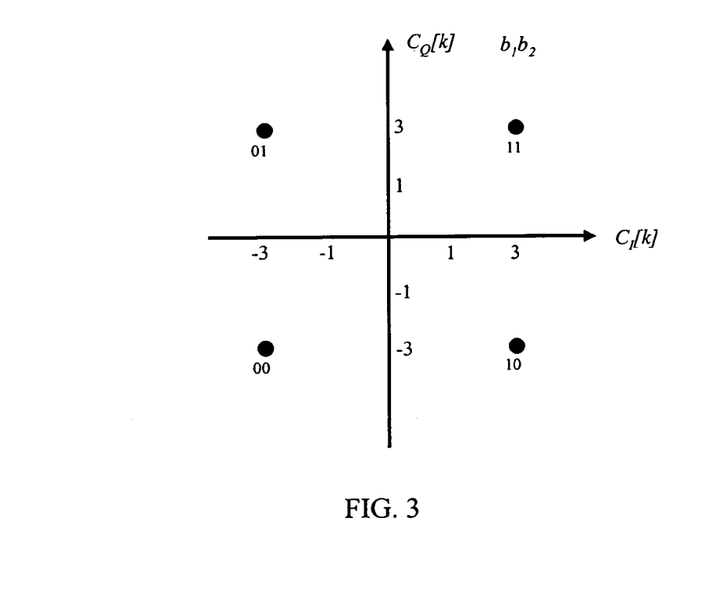
FIG. 3 graphically illustrates one possible implementation of a constellation that may be used in QPSK mapping.

FIG. 3 graphically illustrates one possible implementation of a constellation that may be used in QPSK mapping. Data symbol mapper 104 divides the serial bitstream into groups of two bits each. Each two-bit group is mapped using the constellation of FIG. 3 to generate a data symbol C[k], which has an in-phase (i.e., real) component $C_I[k]$ and a quadrature (i.e., imaginary) component $C_Q[k]$. The in-phase component $C_I[k]$ corresponds to the first bit (i.e., $b_1$) of the two-bit group, and the quadrature component $C_Q[k]$ corresponds to the second bit (i.e., $b_2$) of the two-bit group.

Figure 4:
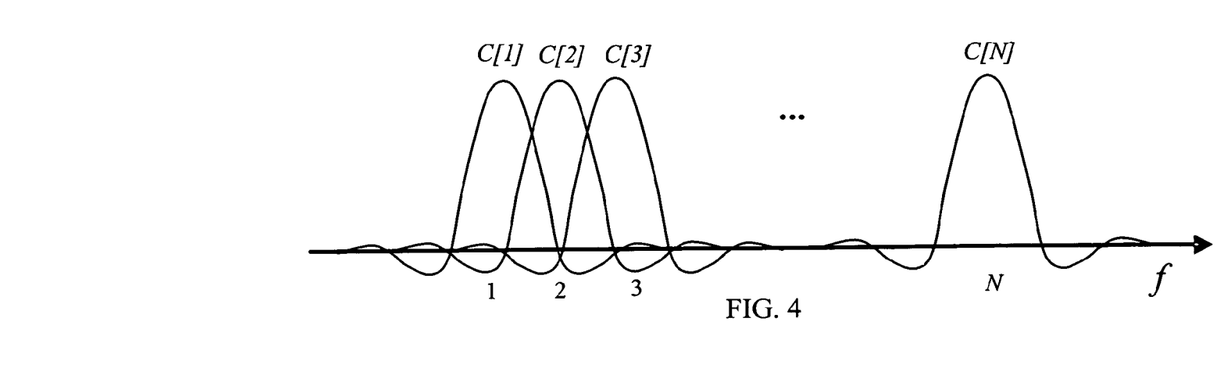
FIG. 4 graphically illustrates a frequency-domain representation of the assignment of a set of data symbols to a set of OFDM tones using SCM.

FIG. 4 graphically illustrates a frequency-domain representation of the assignment of a set of data symbols to a set of OFDM tones using SCM. In this example, the number of data symbols is equal to the number N of tones, and thus, each tone k is assigned a data symbol C[k].

After transmission, demapper 210 of FIG. 2 demaps each equalized data symbol D[k] of each received QPSK, SCM OFDM symbol using the constellation of FIG. 3. Specifically, for each equalized data symbol D[k], demapper 210 estimates the most likely combination of bits given the constellation of FIG. 3.

OFDM Modulation Employing 16-QAM and SCM

In a second OFDM modulation implementation, data symbol mapper 104 employs 16-quadrature amplitude modulation (16-QAM), and IFFT processor 106 employs SCM.

FIG. 5(a) graphically illustrates one possible implementation of a constellation that may be used in 16-QAM mapping. Data symbol mapper 104 divides the serial bitstream into groups of four bits. Each four-bit group is mapped using the constellation of FIG. 5(a) to generate a data symbol C[k], which has a real component $C_I[k]$ and an imaginary component $C_Q[k]$. The real component $C_I[k]$ corresponds to the first two bits (i.e., bits $b_1$ and $b_2$) of the four-bit group, and the imaginary component $C_Q[k]$ corresponds to the third and fourth bits (i.e., bits $b_3$ and $b_4$) of the four-bit group.

IFFT processor 106 then assigns each set of data symbols to a set of N subcarriers using SCM. Assignment is performed in a manner similar to that of the first OFDM modulation implementation discussed above (e.g., as shown in FIG. 4).

After transmission, demapper 210 of FIG. 2 demaps each equalized data symbol D[k] of each received 16-QAM, SCM OFDM symbol using the constellation of FIG. 5(a). Specifically, for each equalized data symbol D[k], demapper 210 estimates the most likely combination of bits given the constellation of FIG. 5(a).

Given the same number N of subcarriers, OFDM modulation implementations employing 16-QAM and SCM are capable of transmitting twice as much data as that of implementations employing QPSK and SCM. Specifically, each data symbol C[k] in a 16-QAM, SCM implementation transmits four bits, while each data symbol C[k] in a QPSK, SCM implementation transmits only two bits. However, demapping of QPSK, SCM implementations is typically more robust against errors than that of 16-QAM, SCM implementations. As shown in FIG. 3 and FIG. 5(a), the constellation points of the 16-QAM constellation are spaced closer together than those of the QPSK constellation. Therefore, in the 16-QAM, SCM implementation, there is a greater chance that one of the equalized data symbols D[k] will be mistaken for an incorrect constellation point. Failure to properly demap the equalized data symbols may result in corrupted data. An error in one demapping may corrupt the entire stream of data, and consequently, the transmission may need to be resent, requiring extra transmission time and computational power.

OFDM Modulation Employing 16-QAM and DCM

In a third OFDM modulation implementation, data symbol mapper 104 employs 16-QAM, and IFFT processor 106 employs dual-carrier modulation. In this case, data symbol mapper 104 generates four-bit groups in a manner similar to that of the second implementation above. However, instead of mapping each group of four bits using one 16-QAM constellation, data symbol mapper 104 maps each group of four bits using two separate 16-QAM constellations. In so doing, data symbol mapper 104 generates two different data symbols for each four-bit group.

Figure 5:
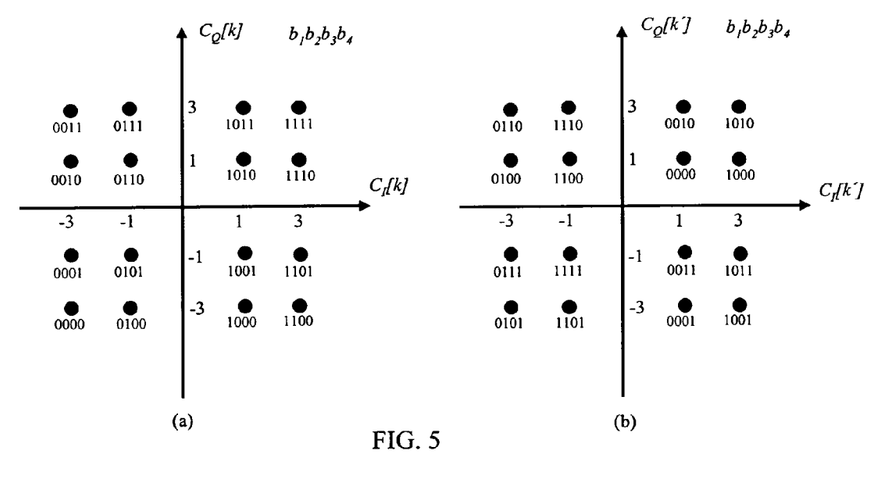
FIG. 5 graphically illustrates two possible implementations of constellations that may be used in 16-QAM mapping.

FIG. 5 graphically illustrates two possible implementations of constellations that may be used for 16-QAM, DCM mapping. Each four-bit group is mapped using the constellation of FIG. 5(a) to generate data symbol C[k]. Additionally, each four-bit group is mapped using the constellation of FIG. 5(b) to generate corresponding data symbol C[k']. Note that data symbols C[k] and C[k'] have real components $C_I[k]$ and $C_I[k']$, respectively, which correspond to the first two bits (i.e., bits $b_1$ and $b_2$) of the four-bit groups and imaginary components $C_Q[k]$ and $C_Q[k']$, respectively, which correspond to the third and fourth bits (i.e., bits $b_3$ and $b_4$) of the four-bit groups.

IFFT processor 106 then assigns each set of N/2 pairs of corresponding data symbols to a set of N subcarriers. Assignment is performed such that the two data symbols in each pair of corresponding data symbols (e.g., C[k] and C[k']) are assigned to two different subcarriers, spaced apart by a number, preferably N/2, of subcarriers.

Figure 6:
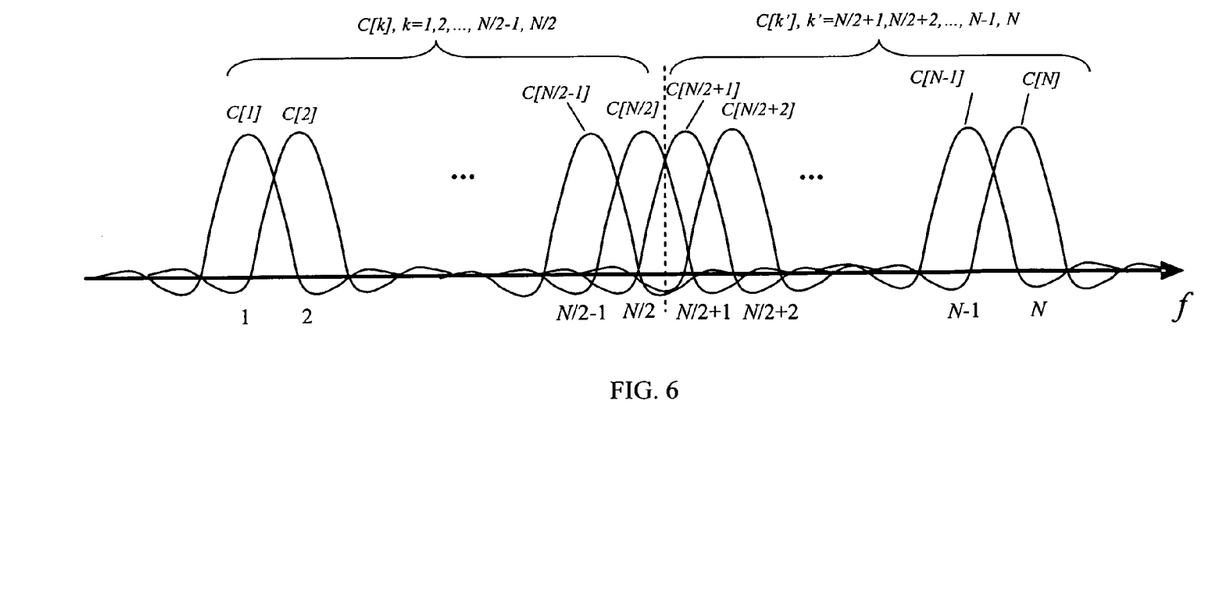
FIG. 6 graphically illustrates a frequency-domain representation of the assignment of a set of pairs of corresponding data symbols to a set of OFDM tones using DCM.

FIG. 6 graphically illustrates a frequency-domain representation of the assignment of a set of N/2 pairs of corresponding data symbols to a set of OFDM tones using DCM. In this example, the number of data symbols is equal to the number N of tones, and thus, each tone is assigned a data symbol. Each data symbol C[k] is assigned to a tone k in the first half of the set of tones (i.e., k=1, 2, . . . , N/2), such that data symbols C[k] range from tone 1 to tone N/2. Each corresponding data symbol C[k'] is assigned to a tone k' in the second half of the set of tones (i.e., k'=N/2+1, N/2+2, . . . , N), such that data symbols C[k'] range from tone N/2+1 to tone N. Furthermore, the two data symbols corresponding to the same four-bit group are separated by a distance of N/2 tones. Thus, tone 1 and tone N/2+1 correspond to the same four-bit group, tone 2 and tone N/2+2 correspond to the same four-bit group, and so forth.

After transmission, demapper 210 of receiver 200 demaps each equalized data symbol D[k] using the constellation of FIG. 5(a) and each equalized data symbol D[k'] using the constellation of FIG. 5(b). If a log-likelihood ratio approach is used, then likelihood estimates are determined for each equalized data symbol. In this case, demapper 210 generates four likelihood estimates for each four-bit group from one equalized data symbol D[k] and four likelihood estimates for the same four-bit group from the corresponding equalized data symbol D[k']. Downstream processing 212 then performs an additional step of combining the two likelihood estimates that correspond to the same four-bit group. Combining may be performed using any of a number of different methods. For example, in one such method, the likelihood estimates could be weighted based on the power of the channel response estimates $\bar{H}[k]$ and $\bar{H}[k']$ received from equalizer 208 and then the weighted likelihood estimates could added together.

Given the same number N of subcarriers, OFDM modulation implementations employing 16-QAM and DCM are capable of transmitting the same amount of data as implementations employing QPSK and SCM. Specifically, 16-QAM, DCM OFDM implementations transmit four bits on two subcarriers (i.e., an average of 2 bits/subcarrier), while QPSK, SCM OFDM implementations transmit two bits on one subcarrier (i.e., an average of 2 bits/subcarrier). Furthermore, since 16-QAM, DCM OFDM implementations use two data symbols (e.g., C[k] and C[k']) for each group of four bits, receiver 200 has two opportunities to recover each bit in a four-bit group. Thus, if one data symbol is corrupted, then the four-bit data group may be recovered from the other data symbol corresponding to the same four-bit group. For this reason, 16-QAM, DCM implementations are more robust against some kinds of data corruption, such as errors caused by frequency selective fading, than QPSK SCM and 16-QAM SCM implementations. However, the method of demodulating each equalized data symbol separately and combining corresponding likelihood estimates downstream does not fully exploit the frequency-diversity advantages gained by employing DCM.

SUMMARY OF THE INVENTION

In one embodiment, the present invention is a method for demapping first and second data symbols, each having a real component and an imaginary component. The first data symbol corresponds to a mapping of a group of four bits using a first 16-QAM constellation and the second data symbol corresponds to a mapping of the group of four bits using a second 16-QAM constellation different from the first 16-QAM constellation. An estimate is generated for a first bit in the group of four bits by applying the real components of the first and second data symbols to a first formula derived using a first hybrid-QPSK constellation generated from the first and second 16-QAM constellations. An estimate is generated for a second bit in the group of four bits by applying the real components of the first and second data symbols to a second formula derived using the first hybrid-QPSK constellation. An estimate is generated for a third bit in the group of four bits by applying the imaginary components of the first and second data symbols to a third formula derived using a second hybrid-QPSK constellation generated from the first and second 16-QAM constellations. An estimate is generated for a fourth bit in the group of four bits by applying the imaginary components of the first and second data symbols to a fourth formula derived using the second hybrid-QPSK constellation.

In another embodiment, the present invention is a receiver for demapping the first and second data symbols described in the previous paragraph. The receiver comprises a data symbol demapper adapted to generate the four estimates described in the previous paragraph.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Overview of Receiver According to One Embodiment of the Present Invention

Figure 7:
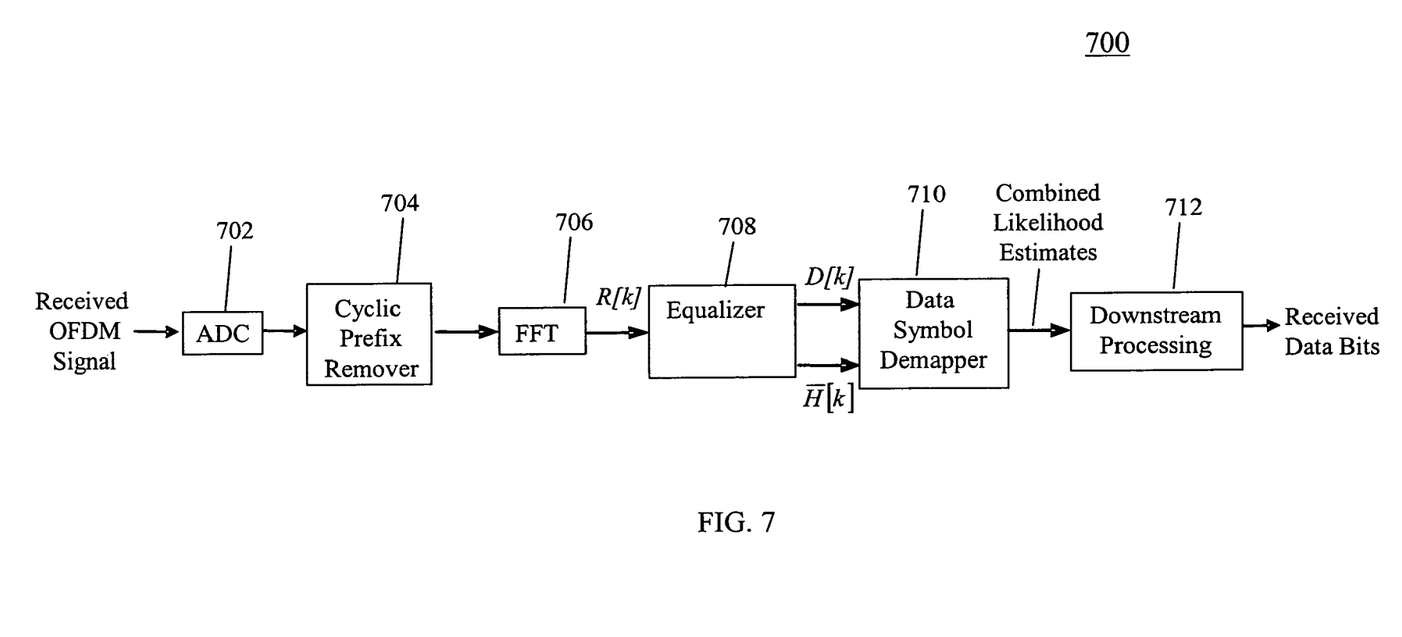
FIG. 7 shows a simplified block diagram of a receiver according to one embodiment of the present invention.

FIG. 7 shows a simplified block diagram of a receiver 700 according to one embodiment of the present invention. Receiver 700 recovers the originally transmitted bitstream from OFDM signals that were generated using 16-quadrature amplitude modulation (16-QAM) and dual-carrier modulation (DCM). Analog-to-digital converter (ADC) 702, cyclic prefix remover 704, fast Fourier transform (FFT) processor 706, and equalizer 708 perform operations analogous to those of the equivalent elements of receiver 200 of FIG. 2. For each received OFDM symbol, FFT processor 706 outputs pairs of corresponding, received data symbols, wherein the two received data symbols in each pair correspond to the same four-bit group. Similar to equalizer 208, equalizer 708 equalizes each received data symbol using any one of a number of methods commonly known in the art and outputs an equalized data symbol.

Receiver 700 also has data symbol demapper 710 which demaps the equalized data symbols. Instead of demapping each equalized data symbol in a corresponding pair of equalized data symbols using one of the two 16-QAM constellations (e.g., FIGS. 5(a) and (b)) and then combining the two corresponding likelihood estimates downstream, as is done in prior-art receiver 200, demapper 710 combines both equalized data symbols in a corresponding pair and performs demapping using two hybrid-QPSK constellations. In so doing, the real components of both equalized data symbols in a corresponding pair (e.g., D[k] and D[k']) are combined and compared to one hybrid-QPSK constellation to determine two combined likelihood estimates for the first two bits (i.e., $b_1$ and $b_2$) in each four-bit group. Similarly, the imaginary components of each corresponding pair of equalized data symbols (e.g., D[k] and D[k']) are combined and compared to another hybrid-QPSK constellation to determine two combined likelihood estimates for the second two bits (i.e., $b_3$ and $b_4$) in each four-bit group. Note that, since the equalized data symbols in a corresponding pair are demapped together, the resulting likelihood estimates are already combined, and therefore, do not need to be combined downstream. Thus, for each corresponding pair of equalized data symbols, demapper 710 outputs four likelihood estimates, wherein each estimate is for one bit of the four-bit group. After demapping, each likelihood estimate is processed by downstream processing 712, which performs operations analogous to those of downstream processing 212.

Discussion of Demapping 16-QAM, DCM OFDM Symbols Using QPSK Constellations

The two hybrid-QPSK constellations used by demapper 710 may be derived from the two 16-QAM constellations used for mapping. For ease of discussion, assume that receiver 700 receives OFDM signals that were generated using the two 16-QAM constellations of FIG. 5 and the DCM tone assignment of FIG. 6. Furthermore, assume that equalizer 708 uses a zero-forcing approach as described in the prior art.

Table I is provided to assist in the generation of the first hybrid-QPSK constellation. The first column lists the four possible arrangements of the first two bits (e.g., $b_1$ and $b_2$). The second column identifies the amplitudes on the $C_I[k]$ axis (e.g., real axis) of FIG. 5(a) that correspond to the two-bit arrangement in the first column. As shown on the constellation of FIG. 5(a), an amplitude of −3 corresponds to bit arrangement 00, an amplitude of −1 corresponds to bit arrangement 01, an amplitude of 1 corresponds to bit arrangement 10, and an amplitude of 3 corresponds to bit arrangement 11. The third column identifies the amplitudes on the $C_I[k']$ axis (e.g., real axis) of FIG. 5(b) that correspond to the two-bit arrangement in the first column. As shown on the constellation of FIG. 5(b), an amplitude of 1 corresponds to bit arrangement 00, an amplitude of −3 corresponds to bit arrangement 01, an amplitude of 3 corresponds to bit arrangement 10, and an amplitude of −1 corresponds to bit arrangement 11. Table I may then be plotted to generate a rotated-QPSK constellation.

TABLE I

Real Components of Two 16-QAM Mapping Constellations
According to One Embodiment of the Present Invention

| $b_1 b_2$ | $C_I[k]$ | $C_I[k']$ |
|---|---|---|
| 00 | −3 | 1 |
| 01 | −1 | −3 |
| 10 | 1 | 3 |
| 11 | 3 | −1 |

Figure 8:
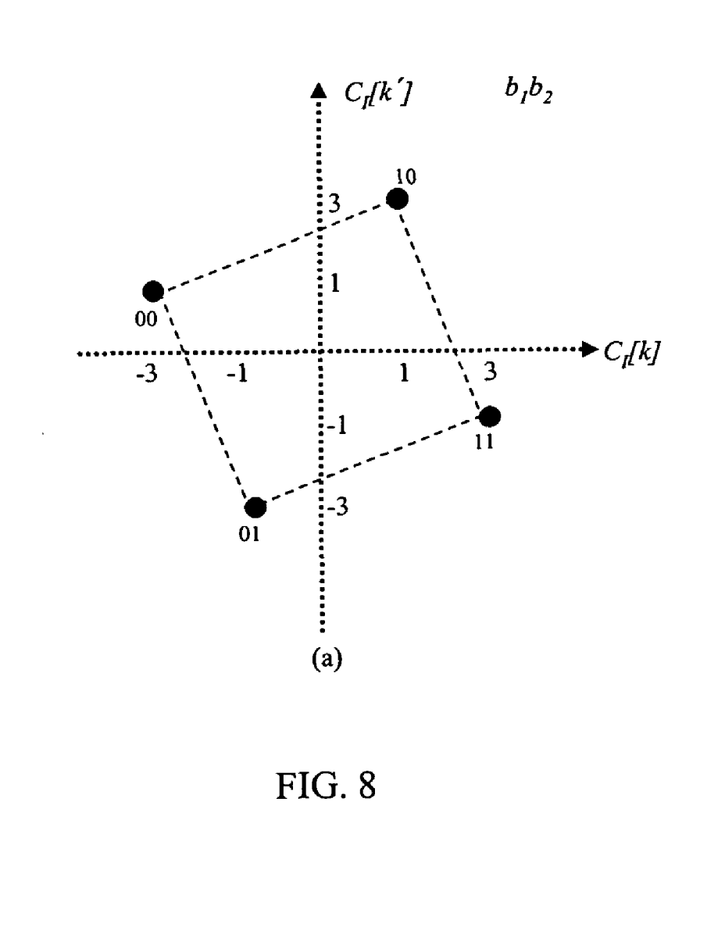
FIG. 8 graphically illustrates a rotated-QPSK constellation generated from Table I.

FIG. 8 graphically illustrates a rotated-QPSK constellation that is generated from Table I. The rotated-QPSK constellation is obtained by plotting the second column (e.g., $C_I[k]$) on the horizontal axis, and the third column (e.g., $C_I[k']$) on the vertical axis.

Figure 9:
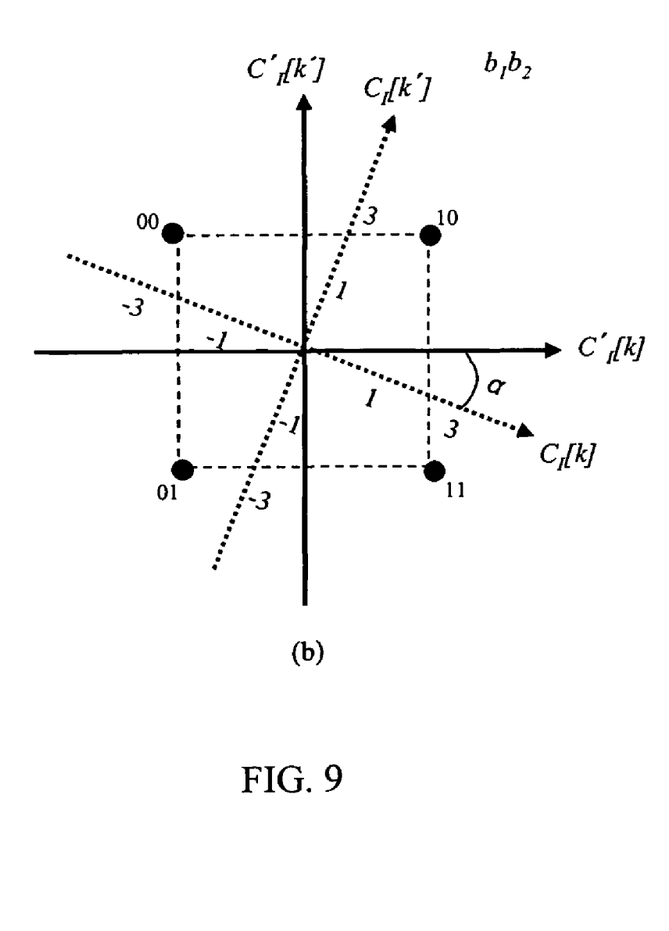
FIG. 9 graphically illustrates a hybrid-QPSK constellation used for demapping 16-QAM, DCM OFDM symbols according to one embodiment of the present invention.

FIG. 9 graphically illustrates a hybrid-QPSK constellation used for demapping 16-QAM, DCM OFDM symbols according to one embodiment of the present invention. The $C'_I[k]$-$C'_I[k']$ coordinate plane of the hybrid-QPSK constellation (shown in solid lines) of FIG. 9 is obtained by rotating the rotated-QPSK constellation of FIG. 8 by an angle $$\alpha = \arctg\left(\frac{1}{2}\right).$$

The relationship of the hybrid-QPSK constellation to the rotated QPSK constellation may be represented by Equations (4) and (5) as follows:

$$C'_I[k] = C_I[k]\cos\alpha + C_I[k']\sin\alpha = \cos\alpha\left(C_I[k] + \frac{1}{2}C_I[k']\right) \quad (4)$$

$$C'_I[k'] = -C_I[k]\sin\alpha + C_I[k']\cos\alpha = \cos\alpha\left(-\frac{1}{2}C_I[k] + C_I[k']\right). \quad (5)$$

Note that the hybrid-QPSK constellation of FIG. 9 is similar to the QPSK constellation of FIG. 3, except that the second bit (e.g., bit $b_2$) of each constellation point is inverted.

To demap each corresponding pair of equalized data symbols, the zero-forcing equalized data symbols in a pair (e.g., Y[k] and Y[k']) are combined and modified to correspond to the $C'_I[k]$-$C'_I[k']$ coordinate plane of FIG. 9. Specifically, zero-forcing equalized data symbols Y[k] and Y[k'] in each corresponding pair may be substituted into Equations (4) and (5) to generate a pair of decision variables, $Y'_I[k]$ and $Y'_I[k']$, as shown in Equations (6) and (7) below:

$$Y'_I[k] = Y_I[k] + \frac{1}{2}Y_I[k'] \quad (6)$$

$$Y'_I[k'] = \frac{1}{2}Y_I[k] - Y_I[k']. \quad (7)$$

Decision variable $Y'_I[k]$ corresponds to the first bit (e.g., bit $b_1$) and decision variable $Y'_I[k']$ corresponds to the second bit (e.g., bit $b_2$) in the hybrid-QPSK constellation of FIG. 9. Note that the constant cos α which is used in Equations (4) and (5) is a common term between $C'_I[k]$ and $C'_I[k']$ and may be ignored in determining the decision variables of Equations (6) and (7). Assuming that bits $b_1$ and $b_2$ are both equal to one, $Y'_I[k]$ and $Y'_I[k']$ each have an approximate mean of 5/2 and approximate variances of $$\frac{4|\overline{H}[k']|^2 + |\overline{H}[k]|^2}{8|\overline{H}[k]|^2|\overline{H}[k']|^2}\sigma^2 \text{ and } \frac{4|\overline{H}[k]|^2 + |\overline{H}[k']|^2}{8|\overline{H}[k]|^2|\overline{H}[k']|^2}\sigma^2,$$

respectively.

Each pair of decision variables calculated using Equations (6) and (7) and the corresponding channel estimates $\overline{H}[k]$ and $\overline{H}[k']$ received from equalizer 708 may then be used by demapper 710 to determine likelihood values for bits $b_1$ and $b_2$. For each decision variable $Y'_I[k]$, the log-likelihood ratio (LLR) is calculated to determine the likelihood value for bit $b_1$. The LLR may be expressed as the log of the probability that $Y'_I[k]$ is a one divided by the probability that $Y'_I[k]$ is a zero, as shown in Equation (8):

$$LLR_I = \log\frac{p(Y'_I[k]|\text{mean} = 5/2)}{p(Y'_I[k]|\text{mean} = -5/2)} \quad (8)$$

$$= \frac{-(Y'_I[k] - 5/2)^2 + (Y'_I[k] + 5/2)^2}{2\frac{4|\overline{H}[k']|^2 + |\overline{H}[k]|^2}{8|\overline{H}[k]|^2|\overline{H}[k']|^2}\sigma^2}$$

$$= \frac{40}{\sigma^2}\frac{|\overline{H}[k]|^2|\overline{H}[k']|^2}{4|\overline{H}[k']|^2 + |\overline{H}[k]|^2}Y'_I[k]$$

$$= \frac{40}{\sigma^2}\frac{|\overline{H}[k']|^2 D_I[k] + \frac{1}{2}|\overline{H}[k]|^2 D_I[k']}{4|\overline{H}[k']|^2 + |\overline{H}[k]|^2}.$$

Similarly, for each decision variable $Y'_I[k']$, the LLR is calculated to determine the likelihood value for bit $b_2$. The LLR may be expressed as the log of the probability that $Y'_I[k']$ is a one divided by the probability that Y'$_I$[k'] is a zero, as shown in Equation (9):

$$LLR'_I = \log\frac{p(Y'_I[k']|\text{mean} = 5/2)}{p(Y'_I[k']|\text{mean} = -5/2)} \quad (9)$$

$$= \frac{-(Y'_I[k']-5/2)^2 + (Y'_I[k']+5/2)^2}{2\frac{4|\overline{H}[k]|^2 + |\overline{H}[k']|^2}{8|\overline{H}[k]|^2|\overline{H}[k']|^2}\sigma^2}$$

$$= \frac{40}{\sigma^2}\frac{|\overline{H}[k]|^2|\overline{H}[k']|^2}{4|\overline{H}[k]|^2 + |\overline{H}[k']|^2}Y'_I[k']$$

$$= \frac{40}{\sigma^2}\frac{\frac{1}{2}|\overline{H}[k']|^2 D_I[k] - |\overline{H}[k]|^2 D_I[k']}{4|\overline{H}[k]|^2 + |\overline{H}[k']|^2}.$$

The LLR values calculated for bits $b_1$ and $b_2$ corresponding to each four-bit group will range from $-\infty$ to $\infty$. As an LLR increases, confidence increases that the given bit is a one. Theoretically, LLR values of $\infty$ indicate absolute certainty that the bit is a one. As an LLR value decreases, confidence increases that the given bit is a zero. Theoretically, LLR values approaching $-\infty$ indicate absolute certainty that the bit is a zero. LLR values close to zero indicate that demapping of the bit is inconclusive.

The process described above may be repeated using the imaginary components of FIGS. 5(a) and 5(b) to determine bits $b_3$ and $b_4$ of each four-bit group. For example, Table II shows the amplitudes of axis $C_Q$[k] of FIG. 5(a) and axis $C_Q$[k'] of FIG. 5(b) corresponding to the four possible arrangements of bits $b_3$ and $b_4$. In this implementation, the numerical values of Table II are identical to those of Table I. Thus, a hybrid-QPSK constellation similar to that of FIG. 9 may be generated for the imaginary components by plotting the second column (e.g., $C_Q$[k]) on the horizontal axis and the third column (e.g., $C_Q$[k']) on the vertical axis. Note that, in other implementations, Table I and Table II may be different, resulting in two different hybrid-QPSK constellations.

TABLE II

Imaginary Components of Two 16-QAM Mapping Constellations According to One Embodiment of the Present Invention

| $b_3b_4$ | $C_Q$[k] | $C_Q$[k'] |
|---|---|---|
| 00 | −3 | 1 |
| 01 | −1 | −3 |
| 10 | 1 | 3 |
| 11 | 3 | −1 |

The hybrid-QPSK constellation generated from Table II is used to generate decision variables Y'$_Q$[k] and Y'$_Q$[k'] as shown in Equations (10) and (11):

$$Y'_Q[k] = Y_Q[k] + \frac{1}{2}Y_Q[k'] \quad (10)$$

$$Y'_Q[k'] = \frac{1}{2}Y_Q[k] - Y_Q[k']. \quad (11)$$

Decision variables Y'$_Q$[k] and Y'$_Q$[k'] are then used to generate likelihood estimates LLR$_Q$ and LLR'$_Q$, shown in Equations (12) and (13), which are used to determine the third and fourth bits (e.g., $b_3$ and $b_4$), respectively, corresponding to each four-bit group.

$$LLR_Q = \frac{40}{\sigma^2}\frac{|\overline{H}[k']|^2 D_Q[k] + \frac{1}{2}|\overline{H}[k]|^2 D_Q[k']}{4|\overline{H}[k']|^2 + |\overline{H}[k]|^2} \quad (12)$$

$$LLR'_Q = \frac{40}{\sigma^2}\frac{\frac{1}{2}|\overline{H}[k']|^2 D_Q[k] - |\overline{H}[k]|^2 D_Q[k']}{4|\overline{H}[k]|^2 + |\overline{H}[k']|^2}. \quad (13)$$

Demapping 16-QAM, DCM OFDM symbols using QPSK constellations as described above provides a relatively simple method for demapping. Furthermore, this method exploits the advantages of frequency diversity gained by using DCM without the need to apply an estimated weight to the corresponding likelihood estimates. Compared to the approach of combining the likelihood estimates downstream as performed in some prior-art receivers, demapping according to the present invention can be more accurate, thereby improving performance of the receiver in demodulating received data symbols. Additionally, since the present invention replaces the relatively complex 16-QAM constellation with a simplified QPSK constellation, the present invention is more computationally efficient than techniques presented in the prior art. For example, a conventional maximum-likelihood estimation, based on the original 16-QAM constellations, compares the pairs of equalized data symbols to all sixteen possible combinations of input bits in order to determine which combination of input bits is most likely. The present invention reduces the number of comparisons by simplifying the pair of 16-QAM constellations into a pair of easily processed QPSK constellations. Therefore, compared to a comparable prior-art demapper, the present invention can reduce memory consumption and can lower the number of mathematical operations that the receiver must perform.

Implementation of Demapping 16-QAM, DCM OFDM Symbols Using QPSK Constellations

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer. One such implementation is suggested in FIG. 10.

Figure 10:
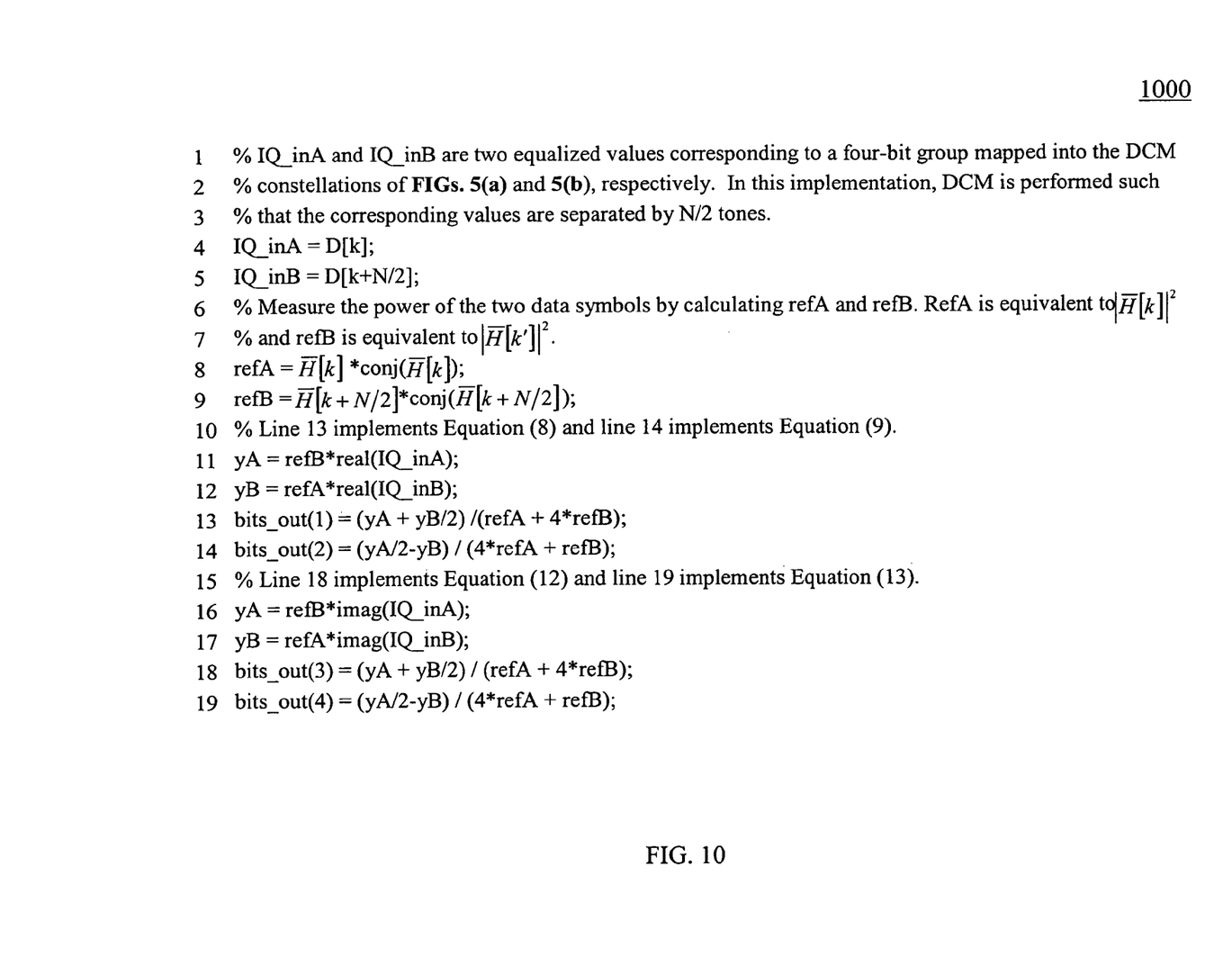
FIG. 10 shows pseudocode that may be used to demap 16-QAM, DCM OFDM symbols according to one embodiment of the present invention.

FIG. 10 shows pseudocode 1000 that may be used to demap each corresponding pair of equalized data symbols derived from a 16-QAM, DCM OFDM symbol according to one embodiment of the present invention. Pseudocode 1000 is repeated for each value k from k=1, . . . , N/2. In lines 4 and 5, each equalized data symbol D[k] is set to IQ_inA, and each corresponding equalized data symbol D[k'] is set to IQ_inB. In lines 8 and 9, pseudocode 1000 calculates the signal strengths of tones k and k' (e.g., factors $|\overline{H}[k]|^2$ and $|\overline{H}[k']|^2$) of Equations (8), (9), (12), and (13)). Line 13 calculates LLR$_I$ of Equation (8) to determine a likelihood estimate for bit $b_1$ of each four-bit group. Line 14 calculates LLR'$_I$ of Equation (9) to determine a likelihood estimate for bit $b_2$ of each four-bit group. Line 18 calculates LLR$_Q$ of Equation (12) to determine a likelihood estimate for bit $b_3$ of each four-bit group. Line 19 calculates LLR'$_Q$ of Equation (13) to determine a likelihood estimate for bit $b_4$ of each four-bit group. Note that, in implementing Equations (8), (9), (12), and (13), the term 40/$\sigma^2$ may be neglected as shown in pseudocode 1000 since this term is common to each calculation.

It will be further understood that various changes in the details, materials, and arrangements of the parts which have been described and illustrated in order to explain the nature of this invention may be made by those skilled in the art without departing from the scope of the invention as expressed in the following claims.

For example, according to alternative embodiments of the present invention, 16-QAM constellations other than those of FIGS. 5(a) and 5(b) may be used for mapping. As such, the hybrid-QPSK constellations used for demapping would be generated from the other 16-QAM constellations. Additionally, the assignment of data symbols to tones using DCM may vary from one embodiment to the next. For example, corresponding data symbols C[k] and C[k'] may be assigned to tones such that they are separated by a number of tones other than N/2.

According to further embodiments of the present invention, equalization methods other than the zero-forcing approach described above may be employed.

While the present invention has been described in regards to its use with OFDM systems, the present invention is not so limited. The present invention may be used for any signal processing communication that transmits multiple data symbols that correspond to the same four-bit group. For example, the present invention may be used to demap multiple corresponding data symbols that were transmitted in a single-carrier communication at different times. Note that, in this example, the extra redundancy of transmitted data would be a type of temporal diversity as opposed to the frequency diversity provided when the invention is applied to OFDM.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

We claim:

1. A method for demapping first and second data symbols, wherein the first data symbol corresponds to a mapping of a group of four bits using a first 16-QAM constellation and the second data symbol corresponds to a mapping of the group of four bits using a second 16-QAM constellation different from the first 16-QAM constellation, the first and second data symbols each having a real component and an imaginary component, the method comprising:

(a) generating an estimate for a first bit in the group of four bits by applying the real components of the first and second data symbols to a first formula derived using a first hybrid-QPSK constellation generated from the first and second 16-QAM constellations;

(b) generating an estimate for a second bit in the group of four bits by applying the real components of the first and second data symbols to a second formula derived using the first hybrid-QPSK constellation;

(c) generating an estimate for a third bit in the group of four bits by applying the imaginary components of the first and second data symbols to a third formula derived using a second hybrid-QPSK constellation generated from the first and second 16-QAM constellations; and (d) generating an estimate for a fourth bit in the group of four bits by applying the imaginary components of the first and second data symbols to a fourth formula derived using the second hybrid-QPSK constellation, wherein:

the first and second 16-QAM constellations each have real components and imaginary components;

the first hybrid-QPSK constellation is generated by plotting the real components of the first 16-QAM constellation on a first axis of a first coordinate plane and the real components of the second 16-QAM constellation on a second axis of the first coordinate plane;

the second hybrid-QPSK constellation is generated by plotting the imaginary components of the first 16-QAM constellation on a first axis of a second coordinate plane and the imaginary components of the second 16-QAM constellation on a second axis of the second coordinate plane; and at least one of (i) the first hybrid-QPSK constellation is further generated by rotating the first coordinate plane and (ii) the second hybrid-QPSK constellation is further generated by rotating the second coordinate plane.

2. The invention of claim 1, wherein:

the first and second 16-QAM constellations each have real components and imaginary components;

the first hybrid-QPSK constellation is generated by plotting the real components of the first 16-QAM constellation on a first axis of a first coordinate plane, and the real components of the second 16-QAM constellation on a second axis of the first coordinate plane, and rotating the first coordinate plane; and the second hybrid-QPSK constellation is generated by plotting the imaginary components of the first 16-QAM constellation on a first axis of a second coordinate plane, and the imaginary components of the second 16-QAM constellation on a second axis of the second coordinate plane, and rotating the second coordinate plane.

3. The invention of claim 1, wherein the first and second data symbols are recovered by demodulating one or more OFDM symbols.

4. The invention of claim 3, wherein the first and second data symbols are recovered from a single DCM OFDM symbol.

5. The invention of claim 1, wherein the first formula for estimating the first bit is a first log-likelihood ratio, the second formula for estimating the second bit is a second log-likelihood ratio, the third formula for estimating the third bit is a third log-likelihood ratio, and the fourth formula for estimating the fourth bit is a fourth log-likelihood ratio.

6. The invention of claim 5, wherein:
the first log-likelihood ratio is proportional to $$\frac{|\overline{H}[k]|^2 D_I[k] + \frac{1}{2}|\overline{H}[k]|^2 D_I[k']}{4|\overline{H}[k']|^2 + |\overline{H}[k]|^2};$$

the second log-likelihood ratio is proportional to $$\frac{\frac{1}{2}|\overline{H}[k']|^2 D_I[k] - |\overline{H}[k]|^2 D_I[k']}{4|\overline{H}[k]|^2 + |\overline{H}[k']|^2};$$

the third log-likelihood ratio is proportional to $$\frac{|\overline{H}[k']|^2 D_Q[k] + \frac{1}{2}|\overline{H}[k]|^2 D_Q[k']}{4|\overline{H}[k']|^2 + |\overline{H}[k]|^2};$$

and
the fourth log-likelihood ratio is proportional to $$\frac{\frac{1}{2}|\overline{H}[k']|^2 D_Q[k] - |\overline{H}[k]|^2 D_Q[k']}{4|\overline{H}[k]|^2 + |\overline{H}[k']|^2};$$

wherein:
$\overline{H}[k]$ is an estimated channel response corresponding to the first data symbol;
$\overline{H}[k']$ is an estimated channel response corresponding to the second data symbol;
$D_I[k]$ is an equalized value of the real component of the first data symbol;
$D_I[k']$ is an equalized value of the real component of the second data symbol;
$D_Q[k]$ is an equalized value of the imaginary component of the first data symbol; and
$D_Q[k']$ is an equalized value of the imaginary component of the second data symbol.

7. The invention of claim 1, further comprising demodulating received OFDM symbols to generate recovered data symbols corresponding to the first and second data symbols.

8. The invention of claim 7, further comprising applying equalization to the recovered data symbols to generate the first and second data symbols.

9. The invention of claim 8, wherein the equalization is zero-forcing equalization.

10. A receiver for demapping first and second data symbols, wherein the first data symbol corresponds to a mapping of a group of four bits using a first 16-QAM constellation and the second data symbol corresponds to a mapping of the group of four bits using a second 16-QAM constellation different from the first 16-QAM constellation, the first and second data symbols each having a real component and an imaginary component, the receiver comprising a data symbol demapper adapted to:

(a) generate an estimate for a first bit in the group of four bits by applying the real components of the first and second data symbols to a first formula derived using a first hybrid-QPSK constellation generated from the first and second 16-QAM constellations;

(b) generate an estimate for a second bit in the group of four bits by applying the real components of the first and second data symbols to a second formula derived using the first hybrid-QPSK constellation;

(c) generate an estimate for a third bit in the group of four bits by applying the imaginary components of the first and second data symbols to a third formula derived using a second hybrid-QPSK constellation generated from the first and second 16-QAM constellations; and (d) generate an estimate for a fourth bit in the group of four bits by applying the imaginary components of the first and second data symbols to a fourth formula derived using the second hybrid-QPSK constellation, wherein:
the first and second 16-QAM constellations each have real components and imaginary components;
the first hybrid-QPSK constellation is generated by plotting the real components of the first 16-QAM constellation on a first axis of a first coordinate plane, and the real components of the second 16-QAM constellation on a second axis of the first coordinate plane;
the second hybrid-QPSK constellation is generated by plotting the imaginary components of the first 16-QAM constellation on a first axis of a second coordinate plane, and the imaginary components of the second 16-QAM constellation on a second axis of the second coordinate plane; and
at least one of (i) the first hybrid-QPSK constellation is further generated by rotating the first coordinate plane and (ii) the second hybrid-QPSK constellation is further generated by rotating the second coordinate plane.

11. The invention of claim 10, wherein:
the first and second 16-QAM constellations each have real components and imaginary components;
the first hybrid-QPSK constellation is generated by plotting the real components of the first 16-QAM constellation on a first axis of a first coordinate plane, and the real components of the second 16-QAM constellation on a second axis of the first coordinate plane, and rotating the first coordinate plane; and
the second hybrid-QPSK constellation is generated by plotting the imaginary components of the first 16-QAM constellation on a first axis of a second coordinate plane, and the imaginary components of the second 16-QAM constellation on a second axis of the second coordinate plane, and rotating the second coordinate plane.

12. The invention of claim 10, wherein the first and second data symbols are recovered by demodulating one or more OFDM symbols.

13. The invention of claim 12, wherein the first and second data symbols are recovered from a single DCM OFDM symbol.

14. The invention of claim 10, wherein the first formula for estimating the first bit is a first log-likelihood ratio, the second formula for estimating the second bit is a second log-likelihood ratio, the third formula for estimating the third bit is a third log-likelihood ratio, and the fourth formula for estimating the fourth bit is a fourth log-likelihood ratio.

15. The invention of claim 14, wherein:
the first log-likelihood ratio is proportional to $$\frac{|\overline{H}[k']|^2 D_I[k] + \frac{1}{2}|\overline{H}[k]|^2 D_I[k']}{4|\overline{H}[k']|^2 + |\overline{H}[k]|^2};$$

the second log-likelihood ratio is proportional to $$\frac{\frac{1}{2}|\overline{H}[k']|^2 D_I[k] - |\overline{H}[k]|^2 D_I[k']}{4|\overline{H}[k]|^2 + |\overline{H}[k']|^2};$$

the third log-likelihood ratio is proportional to $$\frac{|\overline{H}[k']|^2 D_Q[k] + \frac{1}{2}|\overline{H}[k]|^2 D_Q[k']}{4|\overline{H}[k']|^2 + |\overline{H}[k]|^2};$$

and
the fourth log-likelihood ratio is proportional to $$\frac{\frac{1}{2}|\overline{H}[k']|^2 D_Q[k] - |\overline{H}[k]|^2 D_Q[k']}{4|\overline{H}[k]|^2 + |\overline{H}[k']|^2};$$

wherein:
$\overline{H}[k]$ is a channel response corresponding to the first data symbol;
$\overline{H}[k']$ is a channel response corresponding to the second data symbol;
$D_I[k]$ is an equalized value of the real component of the first data symbol;
$D_I[k']$ is an equalized value of the real component of the second data symbol;
$D_Q[k]$ is an equalized value of the imaginary component of the first data symbol; and
$D_Q[k']$ is an equalized value of the imaginary component of the second data symbol.

16. The invention of claim 10, further comprising an FFT transform adapted to convert received OFDM symbols into recovered data symbols corresponding to the first and second data symbols.

17. The invention of claim 16, further comprising an equalizer adapted to apply equalization to the recovered data symbols to generate the first and second data symbols.

18. The invention of claim 17, wherein the equalization is zero-forcing equalization.

19. Apparatus for demapping first and second data symbols, wherein the first data symbol corresponds to a mapping of a group of four bits using a first 16-QAM constellation and the second data symbol corresponds to a mapping of the group of four bits using a second 16-QAM constellation different from the first 16-QAM constellation, the first and second data symbols each having a real component and an imaginary component, the apparatus comprising:

(a) means for generating an estimate for a first bit in the group of four bits by applying the real components of the first and second data symbols to a first formula derived using a first hybrid-QPSK constellation generated from the first and second 16-QAM constellations;

(b) means for generating an estimate for a second bit in the group of four bits by applying the real components of the first and second data symbols to a second formula derived using the first hybrid-QPSK constellation;

(c) means for generating an estimate for a third bit in the group of four bits by applying the imaginary components of the first and second data symbols to a third formula derived using a second hybrid-QPSK constellation generated from the first and second 16-QAM constellations; and (d) means for generating an estimate for a fourth bit in the group of four bits by applying the imaginary components of the first and second data symbols to a fourth formula derived using the second hybrid-QPSK constellation, wherein:

the first and second 16-QAM constellations each have real components and imaginary components;

the first hybrid-OPSK constellation is generated by plotting the real components of the first 16-QAM constellation on a first axis of a first coordinate plane, and the real components of the second 16-QAM constellation on a second axis of the first coordinate plane;

the second hybrid-QPSK constellation is generated by plotting the imaginary components of the first 16-QAM constellation on a first axis of a second coordinate plane, and the imaginary components of the second 16-QAM constellation on a second axis of the second coordinate plane; and at least one of (i) the first hybrid-OPSK constellation is further generated by rotating the first coordinate plane and (ii) the second hybrid-QPSK constellation is further generated by rotating the second coordinate plane.

20. The invention of claim 1, wherein:

the real components of the first and second data symbols are applied to the first hybrid-QPSK constellation to generate a first decision variable and the first formula is derived from a probability distribution of the first decision variable;

the real components of the first and second data symbols are applied to the first hybrid-QPSK constellation to generate a second decision variable and the second formula is derived from a probability distribution of the second decision variable;

the imaginary components of the first and second data symbols are applied to the second hybrid-QPSK constellation to generate a third decision variable and the third formula is derived from a probability distribution of the third decision variable; and the imaginary components of the first and second data symbols are applied to the second hybrid-QPSK constellation to generate a fourth decision variable and the fourth formula is derived from a probability distribution of the fourth decision variable.

21. The invention of claim 10, wherein:

the real components of the first and second data symbols are applied to the first hybrid-QPSK constellation to generate a first decision variable and the first formula is derived from a probability distribution of the first decision variable;

the real components of the first and second data symbols are applied to the first hybrid-QPSK constellation to generate a second decision variable and the second formula is derived from a probability distribution of the second decision variable;

the imaginary components of the first and second data symbols are applied to the second hybrid-QPSK constellation to generate a third decision variable and the third formula is derived from a probability distribution of the third decision variable; and the imaginary components of the first and second data symbols are applied to the second hybrid-QPSK constellation to generate a fourth decision variable and the fourth formula is derived from a probability distribution of the fourth decision variable.

22. The invention of claim 2, wherein the first and second coordinate planes are rotated by about arctg(1/2).

23. The invention of claim 11, wherein the first and second coordinate planes are rotated by about arctg(1/2).

24. A method for demapping first and second data symbols, wherein the first data symbol corresponds to a mapping of a group of four bits using a first 16-QAM constellation and the second data symbol corresponds to a mapping of the group of four bits using a second 16-QAM constellation different from the first 16-QAM constellation, the first and second data symbols each having a real component and an imaginary component, the method comprising:

(a) generating an estimate for a first bit in the group of four bits by applying the real components of the first and second data symbols to a first formula derived using a first hybrid-QPSK constellation generated from the first and second 16-QAM constellations;

(b) generating an estimate for a second bit in the group of four bits by applying the real components of the first and second data symbols to a second formula derived using the first hybrid-QPSK constellation;

(c) generating an estimate for a third bit in the group of four bits by applying the imaginary components of the first and second data symbols to a third formula derived using a second hybrid-QPSK constellation generated from the first and second 16-QAM constellations; and (d) generating an estimate for a fourth bit in the group of four bits by applying the imaginary components of the first and second data symbols to a fourth formula derived using the second hybrid-QPSK constellation, wherein:

the first formula for estimating the first bit is a first log-likelihood ratio proportional to $$\frac{|\overline{H}[k']|^2 D_I[k] + \frac{1}{2}|\overline{H}[k]|^2 D_I[k']}{4|\overline{H}[k']|^2 + |\overline{H}[k]|^2};$$

the second formula for estimating the second bit is a second log-likelihood ratio proportional to $$\frac{\frac{1}{2}|\overline{H}[k']|^2 D_I[k] - |\overline{H}[k]|^2 D_I[k']}{4|\overline{H}[k]|^2 + |\overline{H}[k']|^2};$$

the third formula for estimating the third bit is a third log-likelihood ratio proportional to $$\frac{|\overline{H}[k']|^2 D_Q[k] + \frac{1}{2}|\overline{H}[k]|^2 D_Q[k']}{4|\overline{H}[k']|^2 + |\overline{H}[k]|^2};$$

and the fourth formula for estimating the fourth bit is a fourth log-likelihood ratio proportional to $$\frac{\frac{1}{2}|\overline{H}[k']|^2 D_Q[k] - |\overline{H}[k]|^2 D_Q[k']}{4|\overline{H}[k]|^2 + |\overline{H}[k']|^2};$$

wherein:

$\overline{H}[k]$ is an estimated channel response corresponding to the first data symbol;

$\overline{H}[k']$ is an estimated channel response corresponding to the second data symbol;

$D_I[k]$ is an equalized value of the real component of the first data symbol;

$D_I[k']$ is an equalized value of the real component of the second data symbol;

$D_Q[k]$ is an equalized value of the imaginary component of the first data symbol; and $D_Q[k']$ is an equalized value of the imaginary component of the second data symbol.

25. A receiver for demapping first and second data symbols, wherein the first data symbol corresponds to a mapping of a group of four bits using a first 16-QAM constellation and the second data symbol corresponds to a mapping of the group of four bits using a second 16-QAM constellation different from the first 16-QAM constellation, the first and second data symbols each having a real component and an imaginary component, the receiver comprising a data symbol demapper adapted to:

(a) generate an estimate for a first bit in the group of four bits by applying the real components of the first and second data symbols to a first formula derived using a first hybrid-QPSK constellation generated from the first and second 16-QAM constellations;

(b) generate an estimate for a second bit in the group of four bits by applying the real components of the first and second data symbols to a second formula derived using the first hybrid-QPSK constellation;

(c) generate an estimate for a third bit in the group of four bits by applying the imaginary components of the first and second data symbols to a third formula derived using a second hybrid-QPSK constellation generated from the first and second 16-QAM constellations; and (d) generate an estimate for a fourth bit in the group of four bits by applying the imaginary components of the first and second data symbols to a fourth formula derived using the second hybrid-QPSK constellation, wherein:

the first formula for estimating the first bit is a first log-likelihood ratio proportional to $$\frac{|\overline{H}[k']|^2 D_I[k] + \frac{1}{2}|\overline{H}[k]|^2 D_I[k']}{4|\overline{H}[k']|^2 + |\overline{H}[k]|^2};$$

the second formula for estimating the second bit is a second log-likelihood ratio proportional to $$\frac{\frac{1}{2}|\overline{H}[k']|^2 D_I[k] - |\overline{H}[k]|^2 D_I[k']}{4|\overline{H}[k]|^2 + |\overline{H}[k']|^2};$$

the third formula for estimating the third bit is a third log-likelihood ratio proportional to $$\frac{|\overline{H}[k']|^2 D_Q[k] + \frac{1}{2}|\overline{H}[k]|^2 D_Q[k']}{4|\overline{H}[k']|^2 + |\overline{H}[k]|^2};$$

and the fourth formula for estimating the fourth bit is a fourth log-likelihood ratio proportional to $$\frac{\frac{1}{2}|\overline{H}[k']|^2 D_Q[k] - |\overline{H}[k]|^2 D_Q[k']}{4|\overline{H}[k]|^2 + |\overline{H}[k']|^2};$$

wherein:

$\overline{H}[k]$ is an estimated channel response corresponding to the first data symbol;

$\overline{H}[k']$ is an estimated channel response corresponding to the second data symbol;

$D_I[k]$ is an equalized value of the real component of the first data symbol;

$D_I[k']$ is an equalized value of the real component of the second data symbol;

$D_Q[k]$ is an equalized value of the imaginary component of the first data symbol; and $D_Q[k']$ is an equalized value of the imaginary component of the second data symbol.

* * * * *

UNITED STATES PATENT AND TRADEMARK OFFICE
CERTIFICATE OF CORRECTION

PATENT NO. : 8,102,930 B2
APPLICATION NO. : 11/729345
DATED : January 24, 2012
INVENTOR(S) : Xiaojing Huang et al.

Page 1 of 1

It is certified that error appears in the above-identified patent and that said Letters Patent is hereby corrected as shown below:

In Column 13, Line 23, please replace "$|\overline{H}[k]|^2 D_I[k] - |\overline{H}[k]|^2 D_I[k']$" with $-- |\overline{H}[k']|^2 D_I[k] - |\overline{H}[k]|^2 D_I[k'] --$.

In Column 13, Line 58, please replace "$D_I[k]$" with -- $D_I[k']$ --.

Signed and Sealed this
Second Day of October, 2012

David J. Kappos
*Director of the United States Patent and Trademark Office*